United States Patent
Boisseau et al.

[19]

[11] Patent Number: 6,062,349
[45] Date of Patent: May 16, 2000

[54] DISK BRAKE WITH PRESTRESSED GUIDE TUBE

[75] Inventors: Jean-Pierre Boisseau, Paris; Jean-Claude Mery, Pavillons-Sous-Bois, both of France

[73] Assignee: Bosch Systemes de Freinage, Drancy, France

[21] Appl. No.: 09/068,653

[22] PCT Filed: Apr. 24, 1998

[86] PCT No.: PCT/FR98/00818

§ 371 Date: May 6, 1998

§ 102(e) Date: May 6, 1998

[87] PCT Pub. No.: WO98/57073

PCT Pub. Date: Dec. 17, 1998

[30] Foreign Application Priority Data

Jun. 12, 1997 [FR] France .................................. 97 07307

[51] Int. Cl.[7] .............................. F16D 65/14; B60T 11/00
[52] U.S. Cl. ....................................... 188/73.45; 188/370
[58] Field of Search ................................... 188/370, 73.44, 188/73.45, 73.31, 73.1

[56] References Cited

U.S. PATENT DOCUMENTS 4,355,707 10/1982 Saito ..................................... 188/73.32
4,401,194 8/1983 Klassen ................................ 188/73.44

*Primary Examiner*—Robert J. Oberleitner
*Assistant Examiner*—Bradley King
*Attorney, Agent, or Firm*—Leo H. McCormick Jr; Warrem Comstock

[57] ABSTRACT

A disk brake for a motor vehicle having a caliper (10) and a support (40) which slide with respect to each other to move first (17) and second (20) friction pads into engagement with a disk (30) to effect a brake application. A guide arrangement which allows the caliper (10) to slide with respect to the carrier (40) has a first guide tube (49) connected to the support (40) with a first bore (53) located at right angles to the disk (30) and an external surface (55) which slideable accomodates a first end of each of the first and second friction pads (17,20).

6 Claims, 3 Drawing Sheets

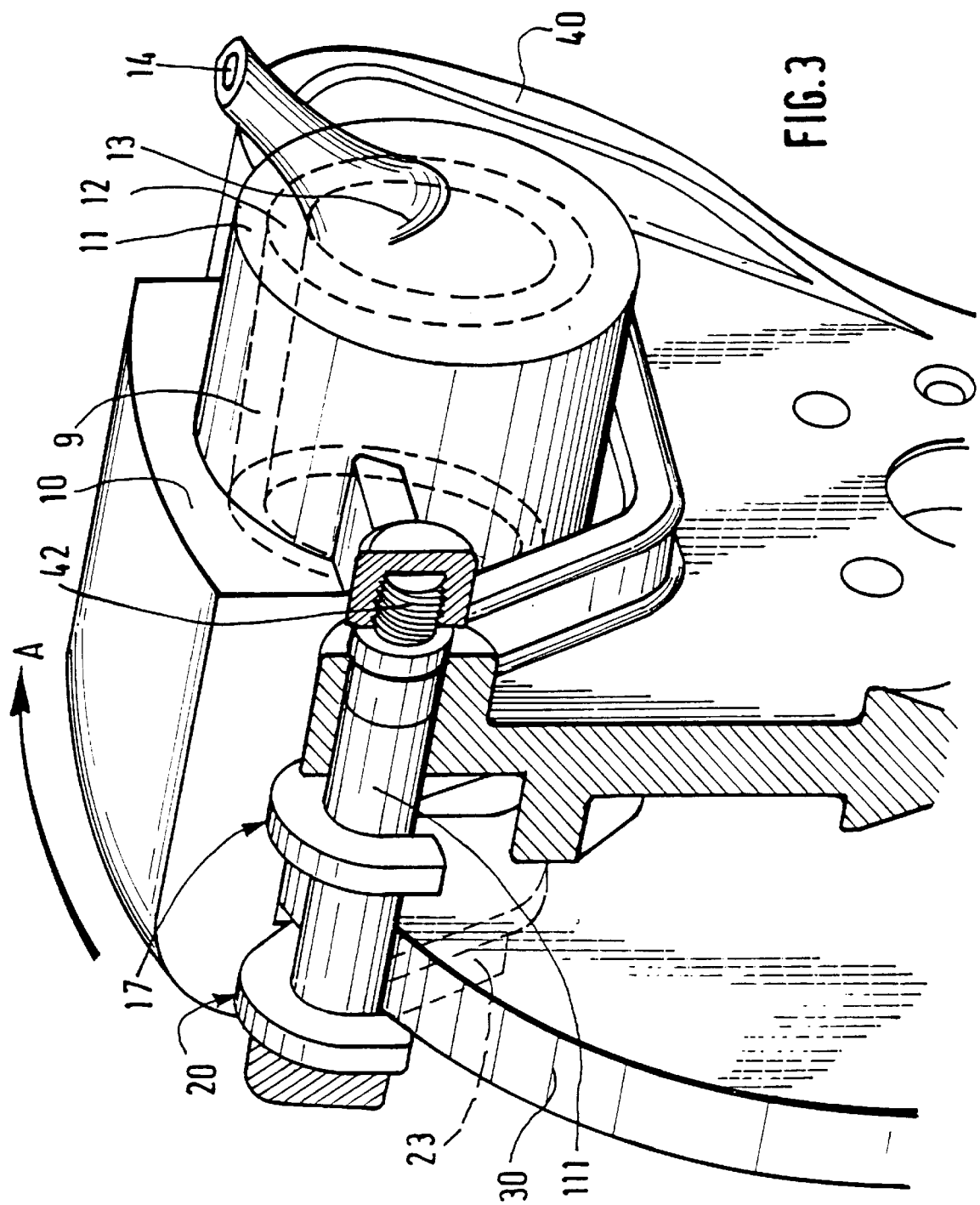

DISK BRAKE WITH PRESTRESSED GUIDE TUBE

The present invention relates to a disk brake for a motor vehicle.

More specifically, the present invention relates to a disk brake of the type comprising: two brake elements which can move one with respect to the other, one of which is a caliper straddling a brake disk and the other of which is a support fixed to the vehicle, the disk adopting a first direction of rotation when the vehicle is moving in a forward gear, and the support having at least a first and a second radial branch, which branches extend axially on each side of an opening straddling the disk; brake-application means comprising a cylinder secured to the caliper and having, facing the disk, an opening which is closed by a moving piston, the disk passing between this piston and a spur of the caliper; two friction pads each comprising at least one lining and a carrier plate having a first end and a second end, the friction pads pointing toward opposite faces of the disk, trapped between the piston and the spur of the caliper and pressed against the disk when the brake-application means are operated, the second end of each friction pad following on from the first end of this pad in the first direction of rotation; and guide means allowing the caliper to slide with respect to the support when the brake-application means are operated, these guide means comprising at least one first guide pin fixed to the caliper at right angles to the disk, a first bore in which the first guide pin can slide axially, and a first guide tube connected to the fixed support at right angles to the disk and in which the first bore is pierced, an external surface of said first guide tube slideably accommodating the respective first ends of the friction pads.

BACKGROUND OF THE INVENTION

Such a brake is known, for example, from the prior art, from U.S. Pat. No. 4,401,194.

One problem arising in brakes of this type which are known as "sliding-caliper brakes" is the difficulty of envisaging, in concrete terms, the use of light alloys for producing calipers and the fixed supports because of the tricky use of inserts obtained by casting especially where the pads slide and the need to provide reinforcements in order to limit the deformation under stress.

SUMMARY OF THE INVENTION

The invention falls within this context and its purpose is to provide a sliding-caliper disk brake of a simple structure in which the guide means are designed to avoid having to resort to inserts and to limit the deformation of the support.

For this purpose, the brake of the invention, which in other respects is in accordance with the preamble above, is essentially characterized in that the first radial branch of the support has, on each side of said opening, two aligned bores pierced between first and second bearing faces of the support, respectively an inboard face and an outboard face, and accommodating the first guide tube, and in that at least the first end of each friction pad comprises attachment means allowing this end to remain in a fixed position relative to the support for the first direction of rotation.

The guide means may also comprise a second guide tube connected to the fixed support at right angles to the disk and in which a second bore is pierced, an external surface of this second guide tube slideably accommodating the second ends of the friction pads.

The attachment means of the respective first ends are preferably in the form of a hook, the opening of which points downward while the respective second ends have sliding means in the form of a slot.

The brake of the invention may be adapted to extreme operating conditions ensuring that the first guide tube at least comprises tightening means separated by an adjustable distance and capable of trapping said first and second bearing face of the support, this resulting in a tensile strain in the first guide tube at least and a compressive strain in said first and second radial branches.

The essential features of the invention will become fully beneficial when the support and the caliper are made of a low-density material such as a light alloy or a composite.

Other features and advantages of the invention will emerge clearly from the description thereof given below by way of non-limiting indication with reference to the appended drawings.

BRIEF DESCRIPTION OF THE DRAWINGS

FIG. 3 is a perspective view of the disk brake of the present invention depicted assembled, in part section on the line III—III of FIG. 2.

DETAILED DESCRIPTION OF THE INVENTION

Figure 1:
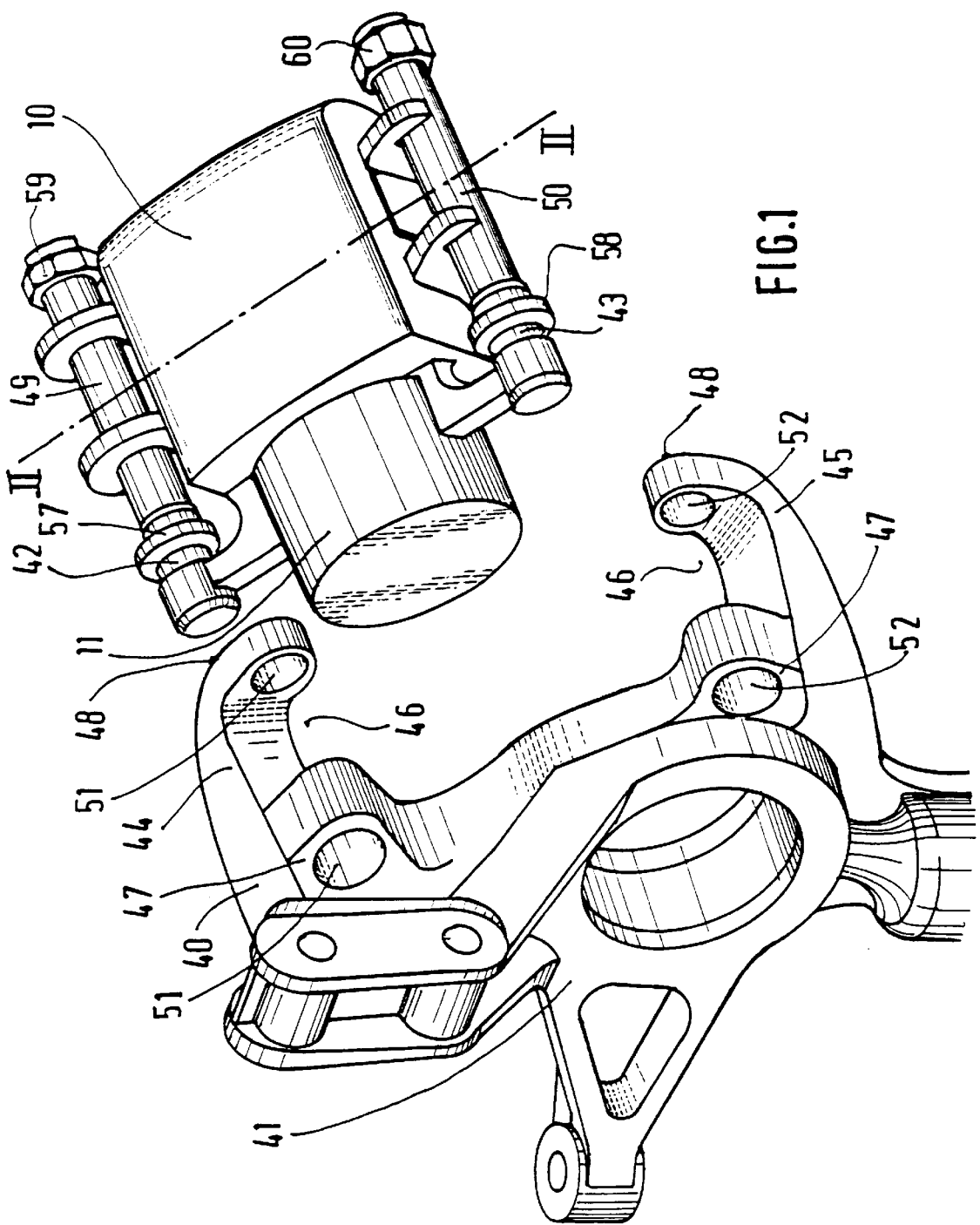
FIG. 1 is a perspective view of the disk brake of the present invention, the moving parts being depicted removed from the fixed support.

Depicted in FIGS. 1 and 3 is a disk brake composed of a caliper 10 and of a fixed support 40 which forms an integral part of or is secured, for example by screwing, to a fixed part 41 of the vehicle, for example a steering knuckle.

The caliper 10 straddles a brake disk 30 secured to a wheel of the vehicle, rotating, for example, in the direction of the arrow A (FIG. 3) when the vehicle is moving in a forward gear.

The caliper 10 on one of its sides, known by convention as the inboard side, comprises brake-application or actuation means formed of a cylinder 9 contained in a boss 11 which is open on the same side as the disk 30 and carries a piston 12 capable of sliding when a pressurized fluid is let into a working chamber 13 by a pipe 14 intended to be connected to a source of pressurized fluid, such as a master cylinder (not depicted) controlling the braking circuit of the motor vehicle. A square seal (not depicted) housed in a groove of the cylinder ensures that the piston 12 slides without leaking.

Figure 2:
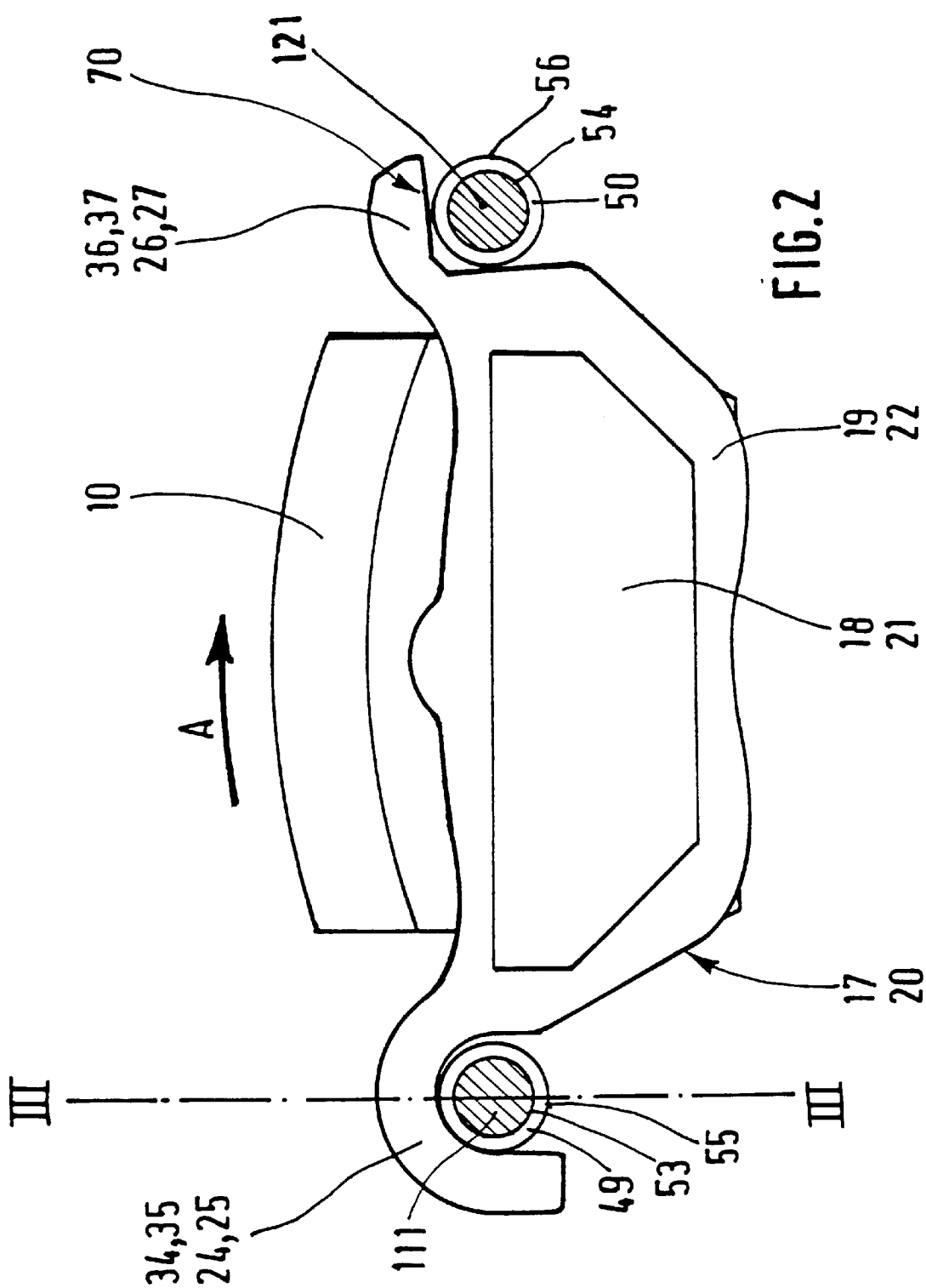
FIG. 2 is a sectional view of the moving parts of the disk brake of the present invention on the line II—II of FIG. 1.

The piston 12 is thus capable of bringing a friction pad 17, which comprises at least one lining 18 and a carrier plate 19 (FIG. 2), directly into contact with one face of the disk 30 and another friction pad 20 comprising at least one lining 21 and a carrier plate 22 against the other face of the disk 30 by reaction via a spur 23 of the caliper which is formed on the other side of the caliper 10, known by convention as the outboard side when the caliper slides axially with respect to the support 40.

As depicted in the figures, the sliding of the caliper on the fixed support 40 is obtained by means of two axially sliding bearing surfaces 42 and 43.

In the embodiment depicted in the figures, the support 40 is of a single piece with the steering knuckle 41. The latter is formed with at least two radial branches 44 and 45 one extending axially on each side of an opening 46 straddling the disk 30, inside which opening the caliper 10 is placed and having an inboard face 47 and an outboard face 48.

The two radial branches 44 and 45 of the support 40 have, on either side of said opening 46, bores 51 and 52 pierced between the inboard face 47 and the outboard face 48, these boards being aligned in a direction at right angles to the disk 30 and accommodating the guide tubes 49 and 50.

In the embodiment depicted in the figures, the first and second guide tubes 49 and 50 consist of cylindrical tubes having a bore 53, 54 and an external surface 55, 56, a first end of which terminates in a flange 57, 58 which comes to bear on the inboard face 47 of the radial branches 44 and 45 of the support 40 and a second end of which is fitted with a tightening means, for example a screw thread and associated nut 59 and 60, the nut bearing, when tightened during assembly, on the outboard face 48 of the radial branches 44 and 45 of the support 40 and giving rise to a tensile strain in the guide tubes and, by reaction, to a compressive strain in the radial branches 44 and 45.

In accordance with the present invention, the first sliding bearing surface 42 is formed of a first axial guide pin 111 secured to the caliper 10 for example by screwing, and accommodated with clearance in the first bore 53 of the first guide tube 49. The axial guide pin 111 extends from the caliper 10 axially, parallel to the axis of the disk 30.

The second sliding bearing surface 43 is formed of a second axial guide pin 121, itself, too, secured to the caliper 10 and accommodated in the second bore 54 of the second guide tube 50. The axial guide pin 121 extends from the caliper 10 axially, parallel to the axis of the disk 30.

Still according to the invention, the carrier plates 19 and 22 comprise, in the order defined by the direction of forward travel of the vehicle (A), first ends 24 and 25 which have attachment means 34 and 35 in the form of a hook, the opening of which points downward and which are slideably accommodated on the external surface 55 of the first guide tube 49, to which they can transmit a first part of the reaction forces that are due to the rubbing of the linings 18 and 21 against the disk 30, as well as second ends 26 and 27 which have sliding means 36 and 37 in the form of a slot 70, slideably accommodated on the external surface 56 of the second guide tube 50.

In a preferred embodiment, the slots 70 each have two almost mutually perpendicular bearing faces of which the first, more or less horizontal one is not in contact with the external surface 56 of the second guide tube 50, while the second, which bears on said external surface 56, can transmit to it a second part of the reaction forces that are due to the rubbing of the linings 18 and 21.

Upon a braking action, with the vehicle travelling in a forward gear, a pressurized fluid is supplied to the chamber 13 to make the piston 12 advance toward the disk 30 and, by reaction, make the spur 23 approach the disk 30. The linings 18 and 21 are thus brought into contact with the faces of the disk 30 in order to slow its speed of rotation.

It can thus be clearly seen that thanks to the invention the reaction forces that are due to the rubbing of the linings 18 and 21 on the disk 30 are transmitted to the support 40 via the guide tubes 49 and 50 without action on the guide pins and that, even under high braking loads, the sliding of the guide pins 111 and 121 of the caliper 10 is not impeded. Furthermore, the layout described hereinabove makes it possible to get over the friction characteristics of the materials used to produce the support 40 and the caliper 10 and envisage the use of light alloys or composites, because all the sliding takes place only on attached guides made, for example, of steel. Furthermore, prestress applied to the radial branches 44 and 45 of the support 40 by the guide tubes benefits their mechanical strength.

Finally, the layout proposed makes it possible, using simple and inexpensive means, to isolate the rubbing surfaces of the guide pins 111, 121 and of the bores 53, 54 from the usual sources of corrosion.

Of course, the invention is not restricted to the embodiment which has been described but can, on the contrary, be modified in a great many ways which will be obvious to those skilled in the art and which fall within the bounds of the appended claims. Thus, for example, the fixed support 40 could well consist of a carrier attached to the steering knuckle 41.

We claim:

1. A disk brake for a motor vehicle, comprising:

first and second brake elements which move one with respect to each, one of said first and second brake elements straddle a caliper of a brake disk and the other of said first and second brake elements being a support which is fixed to the vehicle, said brake disk having a first direction of rotation when the vehicle is moving in a forward gear, said support having at least a first and a second radial branch, said first and second radial branches axially extending on each side of a first opening straddling the disk;

brake-application means comprising a cylinder secured to the caliper and having a second opening facing said brake disk which is closed by a moving piston, said disk passing between said moving piston and a spur of said caliper;

first and second friction pads each comprising at least one lining and a carrier plate having a first end and a second end, said first and second friction pads pointing toward opposite faces of said brake disk, said first and second friction pads being trapped between said piston and said spur of said caliper and being pressed against said brake disk on operation of said brake-application means, said second end of each of said first and second friction pads following said first end in said first direction of rotation;

guide means for allowing said caliper to slide with respect to said support during operation of said brake-application means, said guide means comprising at least one first guide pin fixed to said caliper at right angles to said brake disk and a first bore in which said first guide pin can slide axially and a first guide tube connected to said fixed support at right angles to said brake disk and in which the first bore is pierced, said first guide tube having an external surface for slideably accomodating the respective first ends of said first and second friction pads;

characterized in that said first radial branch of the support has on each side of said first opening an inboard face and an outboard face with corresponding first and second aligned bores pierced between first and second bearing faces of said support to accommodate said first guide tube and in that the first end of said first and second friction pads comprises attachment means in the form of a hook with the opening of which points downward for engagement with said first guide tube.

2. The disk brake according to claim 1, characterized in that said guide means includes a second guide tube connected to said fixed support at right angles to said brake disk and in which a second bore is pierced, and in that an external surface of said second guide tube slideably accommodates the second end of said first and second friction pads.

3. The disk brake according to claim 2, characterized in that said second end of each of said first and second friction pads have sliding means in the form of a slot.

4. The disk brake according to claim 1, characterized in that said first guide tube at least comprises tightening means separated by an adjustable distance and capable of trapping said first and second bearing face of said support to produce a tensile strain in said first guide tube and a compressive strain in said first and second radial branches.

5. The disk brake according to claim 1, characterized in that said support and said caliper are made of a low-density material.

6. The disk brake according to claim 5, characterized in that said low-density material is a light alloy or composite.

* * * * *